(12) United States Patent
Launay et al.

(10) Patent No.: US 10,992,099 B1
(45) Date of Patent: Apr. 27, 2021

(54) TEMPERATURE-COMPENSATING DEVICE AND ELECTRO OPTIC TRANSPONDER IMPLEMENTING SUCH A DEVICE

(71) Applicant: THALES, Courbevoie (FR)

(72) Inventors: François - Xavier Launay, Sophia Antipolis (FR); Raphael Lardat, Sophia Antipolis (FR); Gérard Roux, Sophia Antipolis (FR); Christophe Oubaiche, Sophia Antipolis (FR); Romain Barreau, Sophia Antipolis (FR); Thomas Pastureaud, Sophia Antipolis (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 16/634,522

(22) PCT Filed: Jul. 24, 2018

(86) PCT No.: PCT/EP2018/069999
§ 371 (c)(1),
(2) Date: Jan. 27, 2020

(87) PCT Pub. No.: WO2019/020604
PCT Pub. Date: Jan. 31, 2019

(30) Foreign Application Priority Data

Jul. 27, 2017 (FR) ..................................... 1700797

(51) Int. Cl.
*H01S 3/13* (2006.01)
*H01S 3/139* (2006.01)
(Continued)

(52) U.S. Cl.
CPC ............ *H01S 3/1392* (2013.01); *H01S 3/067* (2013.01); *H01S 3/0675* (2013.01);
(Continued)

(58) Field of Classification Search
CPC ...... H01S 3/0675; H01S 3/1067; H01S 3/067; H01S 3/1392
See application file for complete search history.

(56) References Cited

U.S. PATENT DOCUMENTS

| 6,353,494 B1 * | 3/2002 | Hamada | ................. | G01R 15/24 359/322 |
| 2003/0068127 A1 * | 4/2003 | Franzen | ............... | G02B 6/0218 385/37 |

(Continued)

FOREIGN PATENT DOCUMENTS

| EP | 1 063 546 A1 | 12/2000 |
| EP | 1 308 764 A2 | 5/2003 |

(Continued)

*Primary Examiner* — Kinam Park
(74) *Attorney, Agent, or Firm* — BakerHostetler (57) ABSTRACT

A holder and at least one terminal element that are configured and arranged with respect to one another so as to form a cavity of length ΔL bounded axially by two walls the relative position of which with respect to each other varies in the opposite direction to the variation in ambient temperature, an increase in temperature causing the walls to move closer together and vice versa. A linear structure incorporating the device sees its length decrease when temperature increases and vice versa. Electro-optical transducers comprising a piezoelectric actuator of linear structure that acts on the length of a segment of optical fiber that forms the laser source of the transducer, and having such a device incorporated into the actuator in order to compensate, by modifying the length of the segment of fiber, for the variations in wavelength induced in the laser by the variations in temperature.

12 Claims, 3 Drawing Sheets

(51) Int. Cl.
*H01S 3/067* (2006.01)
*H01S 3/106* (2006.01)
G01H 9/00 (2006.01)
G01V 1/18 (2006.01)

(52) U.S. Cl.
CPC ............ H01S 3/1067 (2013.01); H01S 3/139 (2013.01); *G01H 9/004* (2013.01); *G01V 1/186* (2013.01)

(56) References Cited

U.S. PATENT DOCUMENTS

| | | | |
|---|---|---|---|
| 2003/0081925 A1* | 5/2003 | Albert | G02B 6/29398 385/137 |
| 2007/0058221 A1* | 3/2007 | Heink | H04N 1/047 358/504 |
| 2013/0044984 A1 | 2/2013 | Kim et al. | |
| 2017/0187161 A1* | 6/2017 | Fermann | H01S 3/1608 |
| 2019/0003880 A1* | 1/2019 | Lardat | G08C 23/06 |

FOREIGN PATENT DOCUMENTS

| | | |
|---|---|---|
| FR | 3 045 817 A1 | 6/2017 |
| WO | 03/032043 A1 | 4/2003 |
| WO | 2017/102767 A1 | 6/2017 |

\* cited by examiner

TEMPERATURE-COMPENSATING DEVICE AND ELECTRO OPTIC TRANSPONDER IMPLEMENTING SUCH A DEVICE

CROSS-REFERENCE TO RELATED APPLICATIONS

This application is a National Stage of International patent application PCT/EP2018/069999, filed on Jul. 24, 2018, which claims priority to foreign French patent application No. FR 17/00797, filed on Jul. 27, 2017, the disclosures of which are incorporated by reference in their entirety.

FIELD OF THE INVENTION

The invention relates to the general field of electro-optical devices employing piezoelectric actuators.

It more particularly relates to the field of electro-optical transducers intended to transmit information in optical form by modulating the frequency of an optical-fiber laser, or fiber laser, by means of a piezoelectric actuator.

BACKGROUND

In the general field of acoustic sensor systems and in particular in the field of acoustic hydrophone systems employed in underwater surveillance systems, one known problem is that of transferring the electrical signals produced by the various sensors to a centralized processing system that exploits these signals in a combined way. However, if the system in question comprises a high number of sensors, the number of electrical signals to be transferred is also high.

For this reason, it is known to multiplex these signals in optical form and route them on a single optical fiber or at least on a small number of fibers.

In practice, if the acoustic sensors employed are electro-acoustic transducers, the implementation of a multiplexed transmission through an optical fiber generally consists in associating, with each sensor, an electro-optical transducer capable of producing a light wave of nominal wavelength $\lambda_0$ modulated by the electrical detection signal produced by the acoustic sensor.

Each electro-optical transducer thus produces a modulated light wave capable of occupying a given optical bandwidth, i.e. a wavelength range, about the nominal wavelength $\lambda_0$.

Below, the various multiplexed light waves are transmitted by summing, in a suitable optical fiber, all of the produced light signals while, however, taking care that each electro-optical transducer produces a nominal light wave $\lambda_0$ different from the other transducers and that the wavelength range occupied by the signal that can be produced by one transducer does not overlap with the wavelength range occupied by the signal that can be produced by another transducer.

However, when the number of sensors forming the system in question is truly high, it is sometimes difficult to multiplex all of the produced optical signals into a single optical fiber. For this reason, the value of the margins separating the nominal wavelengths of the electro-optical transducers from one another must be minimized. The number of signals that can be transmitted by a given optical fiber is thus optimized.

However, to do this, it is especially important for the nominal wavelength $\lambda_0$ of the modulated light wave produced by each of the transducers connected to the optical fiber to be kept as stable as possible and to depend as little as possible on temperature conditions.

The French patent application published under the reference FR 3045817 describes, in this regard, an example of an electro-optical transducer intended to convert the electrical signal produced by an electroacoustic sensor, a hydrophone in fact, into a light signal obtained by modulating the wavelength of a fiber laser, comprising a laser cavity consisting of a fiber-optic element forming a Bragg grating.

Figure 5:
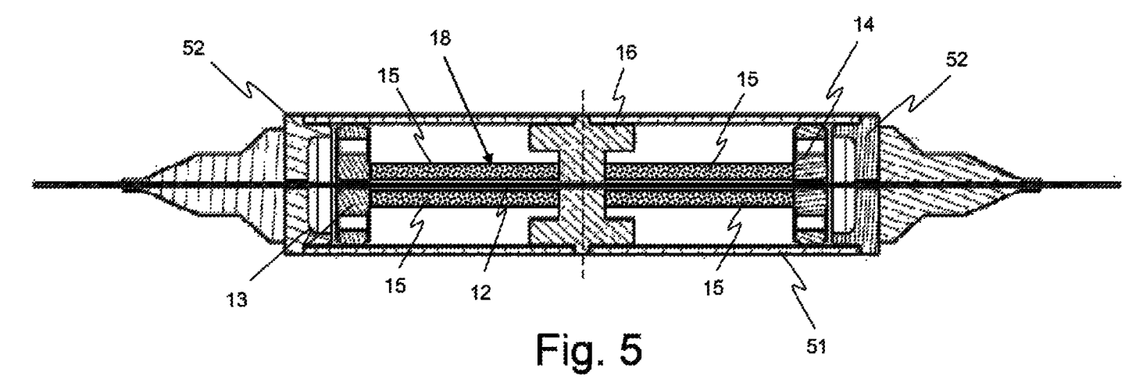
FIG. 5, an example of a known prior-art electro-optical transducer to which the device according to the invention may be applied.

FIG. 5 of the present description illustrates the general structure of such a transducer, the structural details and operation of which are not recalled in the present description.

The general operating principle of such an electro-optical transducer is that the wavelength of the produced laser wave is modulated by making the length of the fiber-optic element 12 forming the cavity of the laser emission source vary, said fiber-optic element being kept taut (mechanical pre-tension) by securing elements 13 and 14 when it is at rest at a given ambient temperature θ.

The variation in length of the fiber-optic element 12 is itself obtained by means of a piezoelectric actuator 18 arranged so as to act on the mechanical tension applied to the fiber-optic element 12 depending on the electrical voltage that is applied thereto, which electrical voltage in this case comes from the electro-acoustic sensor with which the actuator is associated.

The variation in the mechanical tension applied to the fiber causes in a known manner a variation in its length L and thus a variation in the wavelength of the light wave produced.

In the illustration in FIG. 5, the piezoelectric actuator 18 consists of four bars made of piezoelectric material that are placed around the fiber-optic element 12, each bar being fastened via one end to one of the securing elements 13 or 14 and via its other end to a holding element 16 placed in a central position. All thereof are placed in a casing consisting of a cylindrical body 51 closed by two end elements 52, the holding element 16 being securely fastened to the cylindrical body 51.

As may be seen in FIG. 5, the main advantages of such a transducer are the simplicity of its structure, its compactness and its ease of implementation. Specifically, by changing length under the action of an electrical voltage, the piezoelectric actuator 18 acts directly on the mechanical tension applied to the segment of optical fiber 12.

Moreover, advantageously, because the light wave is generated by means of a fiber laser, this type of transducer may easily be connected in series in a fiber-optic link conveying, in multiplexed form, the light wave signals produced by a plurality of sensors.

In contrast, this type of transducer has the drawback of being sensitive to variations in ambient temperature. Specifically, under the effect of variations in temperature, an optical fiber sees its refractive index and, to a lesser extent, its length, vary.

Thus, when ambient temperature varies, the wavelength of the fiber laser varies under the combined effect of the variation in refractive index n of the segment of fiber 12 from which it is formed and in the length of the same segment. These variations themselves cause a variation in the nominal wavelength $\lambda_0$, this having the disadvantageous effect of needlessly broadening the wavelength range capable of being occupied by the signal produced by a transducer.

Therefore, in the prior art, although advantageous in terms of ease of implementation, the use of electro-optical transducers comprising a laser source consisting of a fiber laser, for example a transducer of the type described in the aforementioned patent application, has the effect of limiting the number of transducers that can be connected in series to a given optical fiber without running the risk of degradation of the transmitted signals as a result of variations in temperature.

In such a context, if it is desired to optimize the number of electro-optical transducers of this type able to be multiplexed in series through a given optical fiber, it is necessary to find a solution allowing the effects of the variations in ambient temperature on the wavelength of the light wave produced by such a transducer to be limited or even compensated for completely.

SUMMARY OF THE INVENTION

One aim of the invention is to provide a solution allowing the problem described above to be solved, i.e. consisting in providing a means for making insensitive to variations in ambient temperature an electro-optical transducer comprising a laser source consisting of a wavelength-modulated fiber laser, and especially a transducer of the type described above and one embodiment of which is illustrated in FIG. 5.

To that purpose, one subject of the invention, according to a first aspect, is a device for compensating for variations as a function of temperature in the length of an optical fiber of an electro-optical transducer, comprising a tubular holding element the axis of symmetry of which is coincident with the axis of said optical fiber and two terminal elements arranged axially with respect to the holding element and each comprising a wall that plugs the holding element and delineates inside the latter a cavity of length $\Delta L$.

According to the invention, at least one of the terminal elements, or first terminal element, is configured to form a movable wall inside the holding element, said element having a body of cylindrical shape configured to be able to be inserted inside the tubular holder and to be able to slide axially inside the latter; said cylindrical body comprising an end wall.

The tubular holder and the terminal element are arranged and fastened to each other at an end of the holding element in such a way that the body of the terminal element is kept free to slide inside the holder. The sliding motion of the body of the first terminal element causing the axial movement of its end wall inside the holding element (23) and a variation in the length $\Delta L$ of said cavity.

The materials from which the holding element and the terminal element are respectively made being chosen for their respective coefficients of thermal expansion, such that the direction of variations in the length $\Delta L$ of said cavity as a function of the ambient temperature $\theta$ is of opposite sign to the direction of variation in said ambient temperature.

Advantageously, the device thus behaves, from the point of view of the plugging walls, as an element of negative coefficient of thermal expansion.

In various embodiments that may be implemented separately or in combination, the device for compensating for temperature according to the invention may have various additional features, in particular those described below.

According to a first embodiment, said at least one terminal element comprises a cylindrical body the open end of which has a flanged edge that forms a rim that abuts against the end edge of the holding element when the terminal element is inserted in the latter; said rim being fastened to the end edge of the holding element.

According to another embodiment, the material from which the holding element is made is a material having a coefficient of thermal expansion substantially lower than the coefficient of thermal expansion of the material from which the first terminal element is made.

According to another embodiment, the holding element is made from a material of low coefficient of thermal expansion, in particular from glass, from quartz or from Zerodur, and the first terminal element is made from a material of higher coefficient of thermal expansion, and in particular from a polymer.

According to another embodiment, the device comprises two terminal elements of identical structures, placed at each of the ends of the holding element and forming two movable walls, each terminal element being inserted into the holder via one of the ends of the holder; the lengths of the bodies of the terminal elements being defined in such a way that the length $\Delta L$ of the cavity bounded by the end walls is never zero whatever the value of the ambient temperature $\theta$.

According to another embodiment, the external faces of the end walls of the terminal elements of the device are configured to serve as interfaces with the mechanical structure for which the device is intended to ensure a compensation for temperature.

According to another embodiment, the device comprises a first terminal element placed at one of the ends of the holding element and comprising an end wall forming a movable wall that plugs one of the ends of the holding element, said terminal element being inserted into the holder via one of the ends of the holder; and a second terminal element forming a fixed wall that plugs the other end of the holding element.

The end wall of the first terminal element and the fixed wall forming the second terminal element define the cavity of length $\Delta L$. The length l of the body of the first terminal element is defined in such a way that the length $\Delta L$ of the cavity bounded by the end wall of the latter and the fixed wall is never zero whatever the value of the ambient temperature $\theta$.

Another subject of the invention, according to a second aspect, is an electro-optical transducer comprising a laser source consisting of a segment of optical fiber, forming the laser cavity, said segment of optical fiber being fastened at each of the ends thereof to a securing element.

According to the invention, said securing elements are kept separated from each other by a distance d by a piezoelectric actuator that is placed therebetween and that abuts against them.

The piezoelectric actuator is configured in such a way that its length varies as a function of the electrical voltage that is applied thereto, the variation in length inducing a substantially identical variation in the distance d separating the securing elements.

The piezoelectric actuator comprises a plurality of bars made of piezoelectric material that are arranged longitudinally about the segment of optical fiber between the securing elements, and a device for compensating for temperature according to the invention, said device being arranged in the extension of the bars of the piezoelectric actuator so that the length of the actuator is equal to the sum of the length of the bars of piezoelectric material and of the distance $\Delta L$ that separates the end walls of the terminal elements from the device plugging the holding element.

In various embodiments that may be implemented separately or in combination, the electro-optical transducer according to the invention may have various additional features, in particular those described below.

According to a first embodiment, the length of the piezoelectric actuator is defined in such a way that when the latter is excited by no electrical voltage, the distance d separating the securing elements induces a mechanical pre-tension in the segment of fiber, said pre-tension allowing the actuator to make the length of the segment of fiber vary positively or negatively about a nominal length value corresponding, for the laser source, to an emitted wavelength $\lambda_0$.

According to another embodiment, the device for compensating for temperature comprising two identical terminal elements of cylindrical shape, each comprising an end wall, the piezoelectric actuator comprises a plurality of bars made of piezoelectric material arranged on either side of the device for compensating for temperature.

Each of the bars is mechanically connected to one of the securing elements via one of its ends and to the end wall of one of the terminal elements of said device via its other end.

The respective lengths of the bars placed on either side of said device are substantially identical, so that the latter occupies a median position in the structure of the actuator.

According to another embodiment, the device for compensating for temperature comprising a terminal element forming a movable wall that plugs one end of the holding element and a terminal element forming a fixed wall that plugs the other end of the holding element, the piezoelectric actuator comprises a plurality of bars made of piezoelectric material arranged so that all the bars are mechanically connected to one and the same securing element via one of their ends and to the end wall of the terminal element forming said movable plugging wall via its other end.

Said device is connected via the fixed plugging wall to the other securing element, so that said device occupies an end position in the structure of the actuator.

According to another embodiment, the respective lengths L of the holder and l of the body of an end element forming the device for compensating for temperature are defined in such a way that, given the coefficients of thermal expansion of the materials from which the holder and the end element are respectively made, the variation in the length ΔL of the internal cavity of the device for compensating for temperature, induced by the variation in the ambient temperature θ, is equal, in modulus, to the variation in the length of the segment of optical fiber required to compensate for the variation in the wavelength emitted by the laser source induced by this variation in temperature.

BRIEF DESCRIPTION OF THE DRAWINGS

The features and advantages of the invention will be better appreciated by virtue of the following description, which description makes reference to the appended figures, which show.

It will be noted that, in the various figures, a given structural or functional element is generally identified by the same numerical or alphanumerical reference.

DETAILED DESCRIPTION

For the sake of clarity, the following description describes the device according to the invention with reference to particular examples of implementation so as to demonstrate the advantageous technical features of the invention. However, the use of particular examples is not intended to limit in any way the scope or the extent of the invention, which scope and extent are solely defined by the claims appended to the description.

Figure 1:
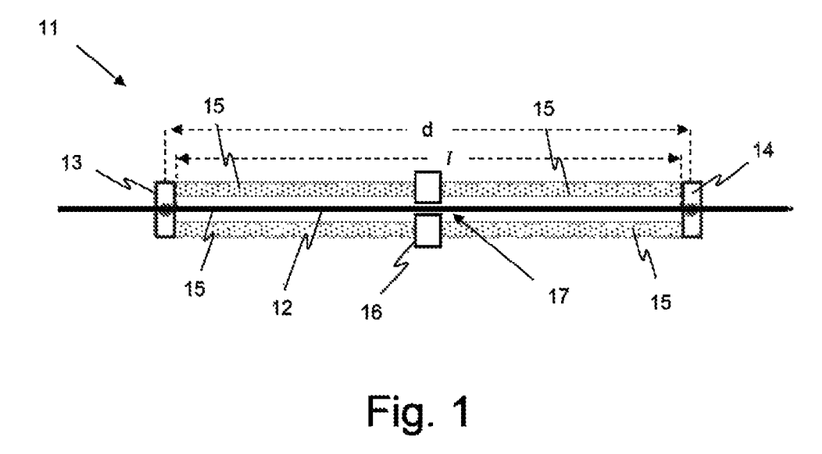
FIG. 1, a schematic illustration of the functional structure of an electro-optical transducer, seen in longitudinal cross section, comprising a laser source, consisting of a fiber laser, modulated by a piezoelectric actuator of a first type.

FIG. 1 schematically shows the functional structure of an example of an electro-optical transducer 11, for which the device according to the invention is especially intended.

Such a transducer 11 mainly comprises a laser emission source consisting of a fiber laser and modulating means formed by a piezoelectric actuator configured to induce a variation in the wavelength emitted by the laser source when it is excited by an electrical voltage.

The fiber laser comprises a segment of optical fiber 12 forming a resonant cavity, a fiber Bragg grating for example, the segment of fiber 12 being fastened via its two ends to securing elements 13 and 14 intended to transmit to the segment of fiber 12 a longitudinal mechanical tension induced by a piezoelectric actuator, the mechanical tension applied to the segment of fiber depending on the distance d separating the two elements 13 and 14.

In the example illustrated in FIG. 1, the piezoelectric actuator consists of bars 15 made of single-crystal piezoelectric material, which are placed longitudinally, or in other words in a direction parallel to the axis of the segment of optical fiber, between the two securing elements 13 and 14, which are dimensioned and arranged so as to keep the two securing elements 13 and 14 separated from each other by a distance d the value of which depends on the electrical voltage that is applied to these bars.

The bars 15 are moreover dimensioned in such a way that when no electrical voltage is applied thereto, they keep the two securing elements 13 and 14 separated from each other by a distance $d_0$ such that the segment of optical fiber forming the laser experiences a mechanical pre-tension of given value. For this distance value $d_0$, the pre-tension applied to the segment of optical fiber 12 for example induces the production of a laser wave of wavelength $\lambda_0$.

From a structural point of view, the bars 15 of piezoelectric material may be arranged in various ways, provided that the arrangement in question allows the mechanical tension applied to the segment of optical fiber 12 to be controlled by making the electrical voltage applied to the bars vary.

In the example of FIG. 1, the electro-optical transducer in question comprises two groups of two bars and an intermediate element 16 of disk shape separating the two groups, all thereof being arranged in such a way that:

for each group the two bars are preferably placed symmetrically with respect to the axis of the segment of fiber 12, the two bars of one group are each placed in the extension of one of the bars of the other group, each of the bars 15 of a given group has an end mechanically fastened to one of the securing elements 13 or 14, the other end abutting against one of the faces of the intermediate element 16, to which it is securely fastened. Hence, two bars 15 located in the extension of each other abut against each of the faces of the intermediate element 16 and are separated from each other by the latter.

The intermediate element 16 moreover has, at its center, an aperture 17 allowing the segment of optical fiber 12 to pass through it freely.

As illustrated in FIG. 1, the distance d between the two securing elements 13 and 14 is controlled by the device consisting of the two groups of bars 15 and the intermediate element 16. At rest, when no electrical voltage is applied to the bars, the distance d is substantially equal to the sum of the lengths of each group of bars 15 and of the thickness ΔL of the intermediate element 16.

From a functional point of view, the electro-optical transducer 11, illustrated in FIG. 1, behaves in such a way that an electrical voltage applied to the bars 15 of the piezoelectric actuator causes a modification in the length of said bars that modifies the value d of the distance between the securing elements 13 and 14. The modification of this distance causes a variation in the length of the segment of optical fiber 12 and hence a variation in the mechanical tension applied to this segment 12.

This variation in the mechanical tension applied to the segment of optical fiber 12 in the end results in a variation in the wavelength λ emitted by the laser source.

In practice, an increase in the mechanical tension induces an increase in the value of the wavelength λ emitted by the laser, and vice versa.

Thus, by making the electrical voltage applied to the actuator vary it is possible to make the wavelength λ of the laser source vary positively or negatively about a nominal value $\lambda_0$, which corresponds to the mechanical tension applied to the segment of fiber 12 when no electrical voltage is applied to the bars 15 of the actuator (pre-tension).

The pre-tension applied to the fiber thus advantageously allows the value of the emitted wavelength λ to be modulated about the value $\lambda_0$ by applying to the bars 15 of the piezoelectric actuator a positive or negative electrical voltage.

However, in the case of a transducer of the type schematically shown in FIG. 1, the variation in the wavelength λ of the wave emitted by the fiber laser not only depends on the variation in the length of the segment of fiber 12, but also on the variation in the refractive index n of the employed fiber. However, such variations are naturally induced by variations in temperature.

In the case of a transducer such as that illustrated in FIG. 1, a variation in the ambient temperature θ thus results in a variation in the wavelength λ emitted by the transducer, which variation may be expressed by the following relationship:

$$\frac{d\lambda}{d\theta} = k_1 \frac{d\eta}{d\theta} + k_2 \frac{dl}{d\theta} \qquad [001]$$

where $k_1$ and $k_2$ are two coefficients of proportionality of given values, dependent on the nature of the fiber in question.

The consequence of this variation over time in the value $\lambda_0$ is to needlessly broaden the optical bandwidth that the modulated wave generated by the transducer 11 is capable of occupying.

Thus, to obtain an electro-optical transducer capable of operating with an optimized optical bandwidth, it is indispensable to provide a means for compensating for the variations in the nominal wavelength $\lambda_0$ due to the variations in ambient temperature θ. The prior-art transducer illustrated in FIG. 1 is devoid of such means.

Figure 2:
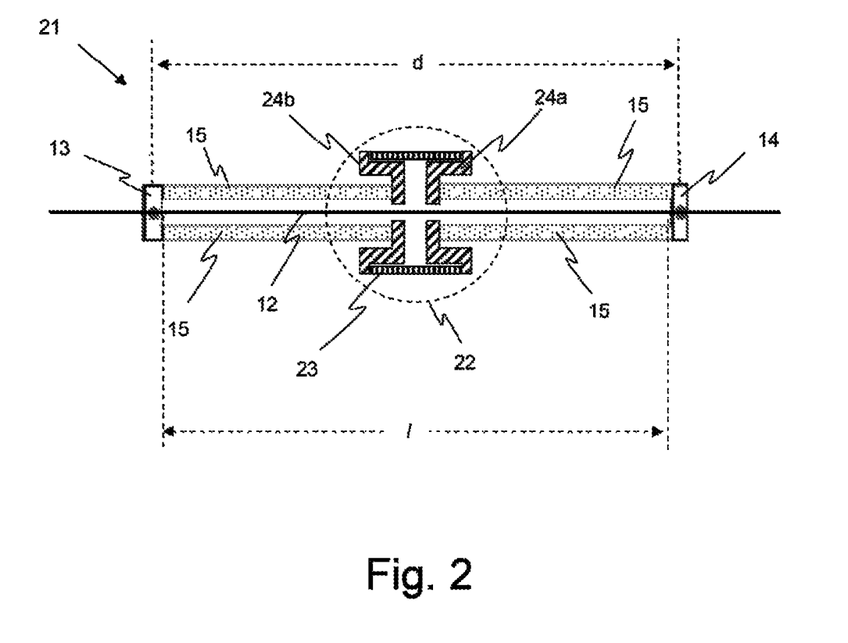
FIG. 2, a schematic illustration of the structure of the compensating device according to the invention, seen in longitudinal cross section, in an embodiment able to be integrated into an electro-optical transducer such as that illustrated in FIG. 1.
Figure 3:
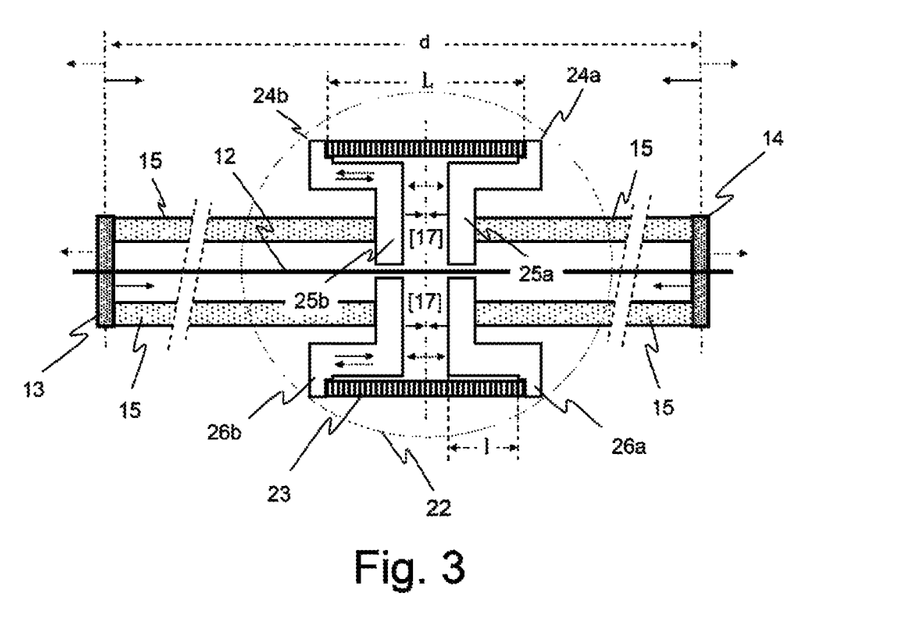
FIG. 3, a schematic illustration of the operating principle of the device according to the invention.

FIGS. 2 and 3 show a simplified representation in longitudinal cross section of an electro-optical transducer 21, of the type illustrated in FIG. 1, incorporating the device 22 for compensating for temperature according to the invention. In this simplified view only the elements of the transducer that are directly involved in the function for generating a modulated light wave have been shown. The means for applying an electrical control voltage to the piezoelectric actuator have in particular not been shown.

Considering relationship [001], it may be seen that to achieve a compensation for the variations in wavelength $\lambda_0$ due to the variations in ambient temperature θ, it is necessary to meet the condition expressed by the following relationship:

$$\frac{dl}{d\theta} = -k\frac{d\eta}{d\theta} \qquad [002]$$

However, for a given optical fiber the variation in the ambient temperature θ induces a variation of same sign in the refractive index n of the fiber, which itself induces a variation of same sign in the value of the wavelength.

In the same way, the variation in the ambient temperature θ induces a variation of same sign in the length of the fiber, which itself induces a variation of same sign in the value of the wavelength.

Thus, to meet the condition of relationship [002], the solution of the invention consists in using an additional means allowing a variation in the length of the segment of fiber 12 of opposite direction to the variation in index induced by the variation in the ambient temperature θ, and of sufficient amplitude to induce a variation in wavelength equal, in modulus, to within a coefficient of proportionality k, to the variation in the optical index, to be induced.

The means used is moreover arranged in the transducer in such a way that the value of the distance d separating from each other the elements 13 and 14 securing the segment of optical fiber 12 forming the laser source, or in other words the length of the segment of fiber 12, is dependent on a dimension of the means, on its thickness for example. In other words, the additional means used is arranged so as to vary the value of the distance d.

In the context of the invention, the additional means consists of a device 22 for compensating for temperature formed of a set of interlocked elements having coefficients of thermal expansion that are substantially different:

- a first holding element 23, made of material of low coefficient of thermal expansion, of glass, of quartz or of Zerodur for example, and
- at least one second element 24, or terminal element, made of a material having a higher coefficient of thermal expansion, a polymer for example.

In the example of implementation illustrated in FIGS. 2 and 3, the device 22 is placed in a central position instead of the intermediate element 16 of FIG. 1 and comprises a holder 23 and two terminal elements 24a and 24b placed at the two ends of the holder 23.

From a morphological and dimensional point of view, the holder 23 of the device 22 has, as illustrated in the cross-sectional view of FIG. 3, the shape of an open-ended tube of length L, and preferably the shape of a cylinder of revolution, having an axis of revolution substantially coincident with the axis of the segment of optical fiber 12, the lateral wall of which defines an internal axial aperture.

Each terminal element 24a or 24b is for its part configured to form a plug intended to partially plug one end of the holder 23 of the device.

Each terminal element 24a or 24b moreover has the shape of a tube, of length l smaller than half the length L of the holder 23. This tube is partially plugged at one of its ends by an end wall, 25a or 25b, or bottom wall, having a central circular aperture allowing the segment of optical fiber 12 of the laser source to freely pass through the device 22, when the latter is in place, whereas the other end is open.

The internal dimensions of a terminal element 24 (24a or 24b) are defined in such a way that the ends of the bars made of piezoelectric material belonging to a given group are able to penetrate into the terminal element and abut against the surface of a bottom wall 25 of said element. For this reason, each terminal element 24 preferably has a substantially constant inside diameter.

The respective dimensions and shapes of the holder 23 and of the terminal elements 24a and 24b are furthermore defined in such a way that the terminal element 24 in question can be inserted via its closed end into the holder 23, and forced into the holder until the edge bounding its open end coincides with the edge of that aperture of the holder 23 via which it was inserted.

Moreover, each terminal element 24 is configured so as to be able to be fastened to the holder 23 at its open end.

For this reason, in one particular embodiment illustrated in FIGS. 2 and 3, the open end of a terminal element 24 (24a or 24b) comprises a circumferential edge 26 (26a or 26b), or flanged edge, also allowing the end of the terminal element to be fastened to the holder 23.

In this embodiment, each terminal element 24 is configured to be inserted into the holder 23 via its end closed by its end wall 25, and to be forced into the holder by an action that causes it to slide along the internal wall of the latter until the flanged edge 26 abuts with the edge bounding that aperture of the holder 23 via which it was inserted into the latter.

Once assembled, the device 22 according to the invention therefore has, in the embodiment of which it is a question here, a tubular central portion of length L that corresponds to the holder 23, which is plugged at each of its ends by a plug that is also of tubular shape and of length l, and that corresponds to a terminal element 24a or 24b, each terminal element being closed at one of its ends by a bottom wall 25. Said plug extends its entire length l into the central portion.

The end walls 25a and 25b of the terminal elements 24a and 24b then define an interior cavity 17 of given length $\Delta L$ equal to $L-2l$.

Thus, because of the integration of the device 22 into the structure of the transducer 21, the piezoelectric actuator is made up of the bars 15 and of the device 22. Each of the bars is mechanically connected to one of the securing elements 13 and 14 via one of its ends and to the plugging wall of one of the terminal elements 24a and 24b of said device 22 via its other end. The respective lengths of the bars 15 placed on either side of said device 22 are substantially identical, so that the latter occupies a substantially median position in the structure of the actuator 18.

The length of the actuator thus formed, and hence the length of the distanced separating the securing elements 13 and 14, is then equal to the sum of the lengths of the bars 15 located on either side of the device and of the length $\Delta L$ of the cavity 17.

From a structural point of view, when the device is assembled, each of the terminal elements 24 is fastened via its end to the holder 23, at one of the end edges of the latter. Thus, a united assembly is obtained in which the relative movements of the two terminal elements 24a and 24b with respect to the holding element 23 are limited to the axial sliding movements of the body of each terminal element 24 along the internal wall of the holder 23, as illustrated in FIG. 3. By axial sliding movement what is meant is the relative movement of the external surface of the body of the terminal element 24 in question with respect to the internal wall of the holder in a direction parallel to the axis of the segment of fiber.

This particular structure gives the device according to the invention a characteristic behavior as a function of temperature that is advantageously taken advantage of in the context of the invention.

Specifically, because of the particular geometry of the elements 23 and 24 from which it is formed, and because the material from which the holder 23 is made has a coefficient of thermal expansion substantially lower than the material from which the terminal elements 24 are made, a variation in ambient temperature $\theta$ causes a variation in the length l of each terminal element 24 that is substantially larger than the variation in the length L of the holder 23 caused by the same variation.

This causes an axial movement of the end walls (bottom walls) 25a and 25b of the terminal elements 24a and 24b, along the longitudinal axis of the segment of fiber 12.

Thus, depending on the direction of variation in the ambient temperature $\theta$, the end walls (bottom walls) 25a and 25b force their way further forward inside the holder 23, such that the length $\Delta L$ of the interior cavity 17 decreases, or conversely get closer to the ends of the holder such that the length $\Delta L$ of the interior cavity 17 increases.

In other words, the two end elements 24a and 24b being mechanically joined to each other by the holder 23, if the distance $\Delta L$ that separates the two walls 25a and 25b is considered, it may be seen that, if the ambient temperature $\theta$ increases, the walls 25a and 25b get closer to each other, as indicated by the solid arrows in FIG. 3, so that two elements that each abut against one of the walls get closer.

Conversely, if the ambient temperature $\theta$ decreases, the walls 25a and 25b get further from each other, as indicated by the dotted arrows in FIG. 3, so that two elements that each abut against one of the walls also get further apart.

Thus, when it is placed in a transducer such as that of FIG. 2, the device 22 according to the invention advantageously behaves like an element having a negative coefficient of thermal expansion that makes the length of the actuator vary in the opposite way to the variation in temperature.

Hence, since the bars 15 have a low coefficient of thermal expansion, the distance d between the two securing elements 13 and 14 varies so that, when the ambient temperature $\theta$ increases, the distance d decreases, this having the effect of decreasing the mechanical tension on the segment of optical fiber 12. The effect of the decrease in the mechanical tension is for its part to decrease the value of the nominal wavelength $\lambda_0$ produced by the laser source, this decreases allowing the increase induced by the variation in the refractive index of the segment of fiber 12 to be compensated for.

Conversely, when the ambient temperature θ decreases, the distance d increases, this having the effect of increasing the mechanical tension on the segment of optical fiber 12. The effect of the increase in the mechanical tension is to increase the value of the nominal wavelength $\lambda_0$ produced by the laser source, this increase allowing the decrease induced by the variation in the refractive index of the segment of fiber 12 to be compensated for.

Production of such a device advantageously allows a simple and inexpensive element that has a characteristic behavior as a function of temperature that only monolithic elements made from particular and expensive materials are normally able to exhibit to be obtained.

From a dimensional point of view, the respective lengths L and l of the holding element 23 and of the terminal elements 24a and 24b are defined so as to obtain a variation in the length ΔL of the interior cavity 17 allowing the desired compensation for temperature to be achieved.

Thus, in the case of an electro-optical transducer such as that illustrated in FIG. 2, the lengths L and l are defined in such a way that, given the respective coefficients of expansion of the materials from which these elements are made, the length ΔL of the interior cavity 17 is never zero, whatever the value of the ambient temperature θ.

L and l are moreover defined in such a way that the variation in the length ΔL of the interior cavity 17 as a function of the ambient temperature θ is substantially equal in modulus to the variation in length that must be applied to the segment of optical fiber 12 forming the laser source of the transducer 21 to make the mechanical tensions applied to the fiber vary in such a way as to cancel out the effects of the variations in the refractive index of the fiber (which variations are induced by the variations in temperature) on the nominal value $\lambda_0$ of the emitted wavelength.

Thus, if an electro-optical transducer such as that schematically illustrated in FIGS. 2 and 3 is considered, the length $l_f$ of the segment of optical fiber 12 comprised between the two securing elements 13 and 14 may be defined, neglecting the thicknesses of the elements 25a and 25b, by the following relationship:

$$l_f = 2(l_s - l_c + l_b) \quad [003]$$

where $l_b$ is the length of one bars 15
and where $l_s = L/2$ corresponds to half the length of the holder 23 and $l_c = l$ to the length of the tubular portion of a terminal element 24.

Thus, in this case, the functional characteristics defining the device according to the invention may be expressed in dimensional terms using the following relationship:

$$\frac{\Delta l_f}{l_f} = \frac{l_s \alpha_s - l_c \alpha_c + l_b \alpha_b}{l_f} = -k \cdot \eta_f \quad [004]$$

where $\eta_f$ is the refractive index of the segment of optical fiber 12 and where $\alpha_s$, $\alpha_c$ and $\alpha_b$ are the coefficients of thermal expansion of the material of the holder 23, of the material of the terminal elements 24 and of the piezoelectric material from which the bars 15 are made, respectively. For its part, k is a simple coefficient of proportionality. By way of example, it will be noted that in the case of a segment of optical fiber consisting of a fiber of glass core, the value of k is such that the product $k \cdot \eta_f$ is substantially equal to $9.36 \times 10^{-6}$.

Practically, the various dimensional characteristics defining the compensating device according to the invention, the values of L and l in particular, may be calculated analytically, if the dimensional characteristics of the transducers into which it is to be placed are known, from the coefficients of thermal expansion of the materials used to produce the holder 23 and the end elements 24 and from the law of variation of the index of the optical fiber forming the segment 12.

It is also possible to produce parts of more complex geometry, by using the finite element method to determine the thermal deformations undergone by the parts 23 and 24 with a view to dimensioning them.

In light of the example of implementation described in the preceding paragraphs and illustrated in FIGS. 2 and 3, the compensating device 22 according to the invention may thus be defined as an element that may advantageously be integrated into the structure of the piezoelectric actuator of the transducer 21 in question.

Because of its particular structure, the compensating device according to the invention advantageously allows an element, having the negative coefficient of thermal expansion required to make the length of the actuator vary so as to compensate for the variations in wavelength induced by the variations in ambient temperature θ, to be introduced into the structure of the piezoelectric actuator.

In the case of the example of implementation described above, the transducer in question has an axial symmetry (i.e. symmetry with respect to a transverse cross-sectional plane passing through the center of the segment of fiber 12), which is sought for particular functional reasons that are not described in detail here.

Hence, the device according to the invention will naturally take the place of the original central element 16 illustrated in FIG. 1 and is structured in a similar way to keep the sought-after axial symmetry. To this end, it thus has a symmetrical structure, with a tubular central holder 23 and two identical terminal elements 24a and 24b, and is placed in a median position inside the transducer.

However, it will be clearly apparent that the technical effect that is being sought when the device according to the invention is employed is above all to provide an element having a coefficient of thermal expansion of negative value.

Figure 4:
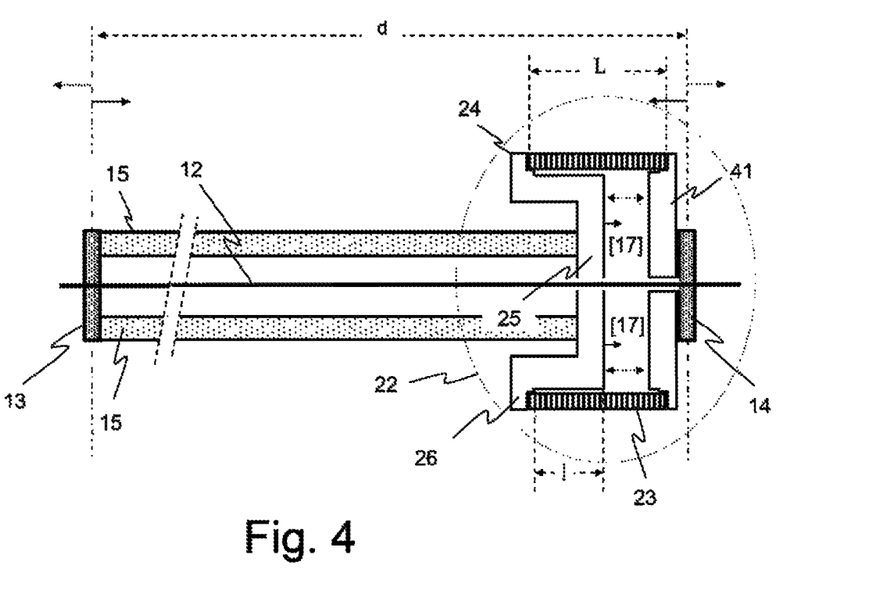
FIG. 4, a schematic illustration of the structure of the compensating device according to the invention, seen in longitudinal cross-sectional view, in another embodiment able to be integrated into an electro-optical transducer, also comprising a laser source, consisting of a fiber laser, modulated by a piezoelectric actuator of a second type.

FIG. 4 illustrates a variant of implementation of the device according to the invention in the context of an electro-optical transducer 31 that operates on the same principle as the transducer 11 considered above, but that does not have the feature of axial symmetry.

The transducer in question here has a simplified structure without intermediate element, the piezoelectric actuator comprising, in this simplified structure, bars 15 that extend without interruption between the two securing elements 13 and 14. In such a context, the device 22 according to the invention may be fitted, as illustrated in FIG. 4, at one of the ends of the actuator by placing the device according to the invention 22 in contact with one of the securing elements 13 or 14.

The device 22 according to the invention then has a simplified form for example comprising a holding element 23 closed at one of its ends by a terminal element formed by a fixed wall 41, and a terminal element 24 similar to the elements 24a and 24b described above. The fixed wall 41 and the end wall 25 of the terminal element 24 together form a cavity 17 the width of which varies as a function of ambient temperature θ analogously to the way in which the length of the cavity defined by the bottom walls 25a and 25b described above varies. Thus, analogously to the preceding case, a device 22 having a negative coefficient of thermal expansion is obtained. However, the variation in the length of the cavity 17 is here induced by the axial movement of the end wall 25 of the terminal element 24 alone.

The piezoelectric actuator here comprise a plurality of bars 15 made of piezoelectric material, which are arranged so that all bars are mechanically joined to one and the same securing element 13 via one of their ends and so that each bar is joined to the end wall 25 of the terminal element 24 of the device 22 via its other end.

The device 22 is joined, via its fixed wall 41, to the other securing element 14, so that said device occupies an end position in the structure of the actuator.

Figure 6:
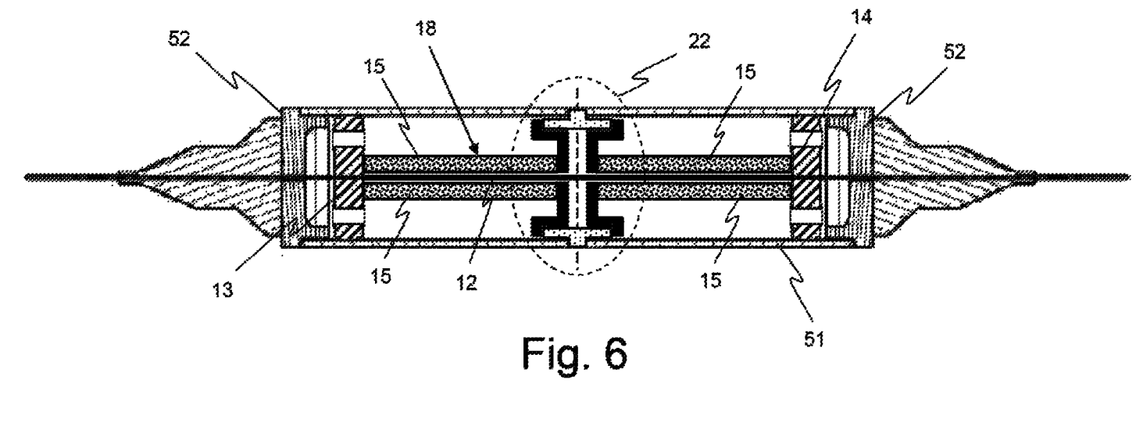
FIG. 6, an illustration showing the device according to the invention installed in the transducer of FIG. 5.

FIGS. 5 and 6 illustrate an axial cross-sectional view of a known prior-art electro-optical transducer the structure and operating principle of which are described, as indicated above, in the French patent application filed by the applicant and published under the reference FR 3045817, and a longitudinal cross-sectional view, cut along the axis of the segment of optical fiber 12, of the same transducer equipped with the compensating device according to the invention, in a central position corresponding to the first example of implementation described in the present description, respectively.

As may be seen by considering the two figures, the device for compensating for temperature according to the invention may advantageously be fitted in such a transducer while preserving the original axial symmetry. To do this, it is simply necessary to employ a compensating device of symmetrical structure especially comprising two terminal elements 24.

The invention claimed is:

1. A device for compensating for variations as a function of temperature in the length of an optical fiber of an electro-optical transducer, comprising a tubular holding element the axis of symmetry of which is coincident with the axis of said optical fiber and two terminal elements arranged axially with respect to the holding element and forming two walls that plug the holding element so as to delineate inside the holder a cavity of length ΔL; wherein at least a first terminal element is configured to form a movable wall inside the holding element, said element having a body of cylindrical shape configured to be able to be inserted inside the tubular holder and to be able to slide axially inside the latter; said cylindrical body comprising an end wall, the tubular holder and the terminal element being arranged and fastened to each other at the end edge of the holding element in such a way that the body of the terminal element is kept free to slide inside the holder; the sliding motion of the body of the first terminal element causing the axial movement of its end wall inside the holding element and a variation in the length ΔL of said cavity; the materials from which the holding element and the terminal element are respectively made being chosen for their respective coefficients of thermal expansion, such that the direction of variations in the length ΔL of said cavity as a function of the ambient temperature θ is of opposite sign to the direction of variation in said ambient temperature.

2. The compensating device as claimed in claim 1, wherein said first terminal element forming a movable wall comprises a cylindrical body the open end of which has a flanged edge, said edge abutting against the end edge of the holder when the terminal element is inserted in the holder; said rim being fastened to the end edge of the holding element.

3. The device for compensating for temperature as claimed in claim 1, wherein the material from which the holding element is made is a material having a coefficient of thermal expansion substantially lower than the coefficient of thermal expansion of the material from which the first terminal element is made.

4. The device for compensating for temperature as claimed in claim 1, wherein:
the holder is made from a material of low coefficient of thermal expansion, in particular from glass, from quartz or from Zerodur, and
the first terminal element is made from a material of higher coefficient of thermal expansion, and in particular from a polymer.

5. The device for compensating for temperature as claimed in claim 1, wherein it comprises two terminal elements of identical structures, placed at each of the ends of the holding element and forming two movable walls, each terminal element being inserted into the holder via one of the ends of the holder; the lengths of the bodies of the terminal elements being defined in such a way that the length ΔL of the cavity bounded by the end walls is never zero whatever the value of the ambient temperature θ.

6. The device for compensating for temperature as claimed in claim 5, wherein the external faces of the end walls of the terminal elements of the device are configured to serve as interfaces with the mechanical structure for which the device is intended to ensure a compensation for temperature.

7. The device for compensating for temperature as claimed in claim 1, wherein it comprises a first terminal element placed at one of the ends of the holding element and comprising an end wall forming a movable wall that plugs one of the ends of the holding element, said terminal element being inserted into the holder via one of the ends of the holder; and a second terminal element forming a fixed wall that plugs the other end of the holding element; the end wall of the first terminal element and the fixed wall forming the second terminal element defining the cavity of length ΔL; the length l of the body of the first terminal element being defined in such a way that the length ΔL of the cavity bounded by the end wall of the latter and the fixed wall is never zero whatever the value of the ambient temperature θ.

8. An electro-optical transducer comprising a laser source consisting of a segment of optical fiber fastened at each of the ends thereof to securing elements; said securing elements being kept separated from each other by a distance d by a piezoelectric actuator that is placed therebetween and that abuts against them; the actuator being configured in such a way that its length varies as a function of the electrical voltage that is applied thereto, the variation in length inducing a substantially identical variation in the distance d separating the securing elements; the transducer being wherein the actuator comprises a plurality of bars made of piezoelectric material that are arranged longitudinally about the segment of optical fiber between the securing elements and a device for compensating for temperature as claimed in claim 1, said device being arranged in the extension of the bars of the actuator so that the length of the actuator is substantially equal to the sum of the length of the bars of piezoelectric material and of the distance ΔL separating the plugging walls of the device.

9. The electro-optical transducer as claimed in claim 8, wherein the length of the piezoelectric actuator is defined in such a way that when the latter is excited by no electrical voltage, the distance d separating the securing elements induces a mechanical pre-tension in the segment of fiber, said pre-tension allowing the actuator to make the length of the segment of fiber vary positively or negatively about a nominal length value corresponding, for the laser source, to an emitted wavelength $\lambda_0$.

10. The electro-optical transducer as claimed in claim 8, comprising the device for compensating for temperature as claimed in claim 8, the piezoelectric actuator comprising a plurality of bars made of piezoelectric material arranged on either side of the device for compensating for temperature, each of the bars being mechanically connected to one of the securing elements via one of its ends and to one of the plugging walls of said device via its other end, the respective lengths of the bars placed on either side of said device being substantially identical, so that the latter occupies a median position in the structure of the actuator.

11. The electro-optical transducer as claimed in claim 8, comprising the device for compensating for temperature as claimed in claim 8, the piezoelectric actuator comprising a plurality of bars made of piezoelectric material arranged so that all the bars are mechanically connected to one and the same securing element via one of their ends and so that each bar is connected to the plugging wall of the first terminal element of the device for compensating for temperature via its other ends, said device being connected via its fixed wall to the other securing element, so that said device occupies an end position in the structure of the actuator.

12. The electro-optical transducer as claimed in claim 8, wherein the respective lengths L of the holder and l of the body of an end element forming the device for compensating for temperature are defined in such a way that, given the coefficients of thermal expansion of the materials from which the holder and the end element are respectively made, the variation in the length $\Delta T$, of the internal cavity of the device for compensating for temperature, induced by the variation in the ambient temperature $\theta$, is equal, in modulus, to the variation in the length of the segment of optical fiber required to compensate for the variation in the wavelength emitted by the laser source induced by this variation in temperature.

* * * * *

UNITED STATES PATENT AND TRADEMARK OFFICE
CERTIFICATE OF CORRECTION

PATENT NO.         : 10,992,099 B1
APPLICATION NO.    : 16/634522
DATED              : April 27, 2021
INVENTOR(S)        : François - Xavier Launay et al.

Page 1 of 1

It is certified that error appears in the above-identified patent and that said Letters Patent is hereby corrected as shown below:

In the Claims

In Claim 12, Column 16, Line 12, "in the length $\Delta T$" should be -- in the length $\Delta L$ --.

Signed and Sealed this
Seventh Day of September, 2021

Drew Hirshfeld
*Performing the Functions and Duties of the*
*Under Secretary of Commerce for Intellectual Property and*
*Director of the United States Patent and Trademark Office*